(12) United States Patent
Mintz

(10) Patent No.: US 8,788,387 B1
(45) Date of Patent: Jul. 22, 2014

(54) METHODS AND SYSTEMS FOR MONITORING AND CONTROLLING ORDER MESSAGE TRAFFIC

(71) Applicant: Trading Technologies International, Inc., Chicago, IL (US)

(72) Inventor: Sagy Pundak Mintz, Lincolnshire, IL (US)

(73) Assignee: Trading Technologies International, Inc, Chicago, IL (US)

( * ) Notice: Subject to any disclaimer, the term of this patent is extended or adjusted under 35 U.S.C. 154(b) by 0 days.

(21) Appl. No.: 13/743,208

(22) Filed: Jan. 16, 2013

(51) Int. Cl.
*G06Q 40/00* (2012.01)

(52) U.S. Cl.
USPC .............................................. 705/35; 705/37

(58) Field of Classification Search
USPC .................................................... 705/35–45
See application file for complete search history.

(56) References Cited

U.S. PATENT DOCUMENTS

| 7,124,110 | B1  | 10/2006 | Kemp, II et al. |        |
|-----------|-----|---------|-----------------|--------|
| 7,680,721 | B2  | 3/2010  | Cutler          |        |
| 8,156,023 | B2* | 4/2012  | DePetris et al. | 705/35 |
| 2006/0190386 | A1 | 8/2006 | Levy           |        |

FOREIGN PATENT DOCUMENTS

WO 2011/056399 A1 5/2011

OTHER PUBLICATIONS

International Search Report and Written Opinion for International Application No. PCT/US2013/035643 dated Jun. 13, 2013 (mailed Jun. 25, 2013).

\* cited by examiner

*Primary Examiner* — Richard C Weisberger
(74) *Attorney, Agent, or Firm* — McDonnell Boehnen Hulbert & Berghoff LLP

(57) ABSTRACT

Example methods, systems, and tangible computer readable storage media disclosed herein provide for tracking of order messages. An example method includes tracking, using a computing device, an order message, the order message including an order for a tradeable object in a trading market. The trading market includes an inside market. The example method includes determining, using the computing device, whether the order is directed to the inside market of the trading market. If the order is determined to be directed to the inside market, the example method includes adjusting a weighting factor to decrease a message ratio. The message ratio compares a weighted order message total to a fill total. If the order is determined to be directed away from the inside market, the example method includes adjusting a weighting factor to increase the message ratio. The example method includes determining, using the computing device, if the message ratio satisfies a message ratio threshold. The example method includes implementing, using the computing device, message ratio handling if the message ratio satisfies the message ratio threshold.

19 Claims, 9 Drawing Sheets

METHODS AND SYSTEMS FOR MONITORING AND CONTROLLING ORDER MESSAGE TRAFFIC

BACKGROUND

An electronic trading system generally includes a trading device in communication with an electronic exchange. The electronic exchange sends information about a trading market, such as prices and quantities, to the trading device. The trading device sends messages, such as messages related to orders, to the electronic exchange. The electronic exchange attempts to match quantity of an order with quantity of one or more contra-side orders.

Some messages and/or orders sent by the trading device to the electronic exchange may adversely impact the trading market. For example, messages attempting to place an order with a large price difference from a best bid or offer in the trading market may decrease trading market liquidity. In some examples, submitting orders and deleting the orders may decrease trading market liquidity.

BRIEF DESCRIPTION OF THE FIGURES

Certain embodiments are disclosed with reference to the following drawings.

Figure 1:
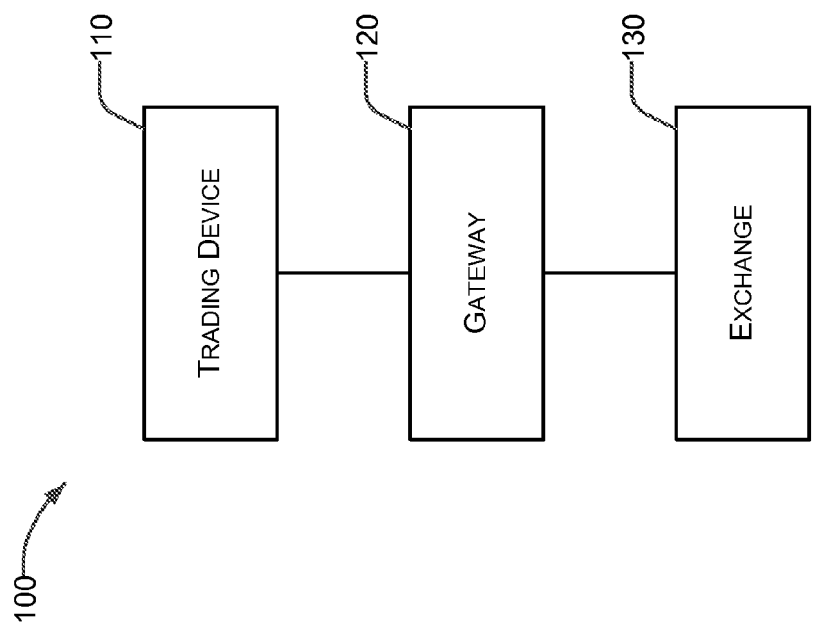
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

Trading devices communicate order messages to exchanges to buy or sell tradeable objects. Order messages may include, for example, commands to place orders to buy or sell tradable objects, commands to initiate managing orders according to a defined trading strategy, and/or commands to change or cancel previously submitted orders. It is desirable for an order message attempting to place an order to buy a particular tradable object to be filled at the exchange. If an order associated with an order message is not filled, it is desirable for the order to be within the inside market, or close to the inside market. The inside market is defined as a range between the lowest available ask price and the highest available bid price in a trading market. Orders within the inside market facilitate trading market liquidity. Trading market liquidity is the ability of a tradeable object to be sold without causing a significant movement in the price and with minimum loss of value.

In some examples, it is undesirable for orders in order messages to be outside of the inside market because such orders are unlikely to be filled. It may be undesirable for an excessive amount of order messages to be sent to exchanges. It may be undesirable for orders in order messages to be sent and then altered and/or deleted (e.g., orders that are sent and then immediately deleted in another order message). Such undesirable order messages adversely affect electronic trading systems (e.g., including exchanges, trading devices, etc.). For example, undesirable order messages can adversely impact exchange and/or trading device bandwidth. Orders outside of the inside market may cause exchanges to adjust price distributions in the trading market.

Examples disclosed herein provide a messaging monitoring and control system to encourage order messages being sent that improve trading markets (e.g., orders within the inside market that increase trading market liquidity) and to discourage order messages being sent that adversely affect trading markets and/or trading systems (e.g., orders that are outside of the inside market that decrease trading market liquidity). An example messaging monitoring and control system disclosed herein determines a message ratio for a user (e.g., a trader). In some examples, the message ratio compares a weighted message total to a fill total. In some examples, a message ratio having a large amount of weighted total messages and a small amount of fills is penalized. In some examples, a trading system with a message ratio having a small amount of weighted total messages and a large amount of total fills is rewarded.

In some examples, when order messages are sent that improve trading markets (e.g., increase trading market liquidity), the message ratio is credited. In some examples, order messages are weighted such that order messages with orders that are filled decrease the weighted order message total by one full order and order messages with orders that are within the inside market decrease the weighted order message total by one half of an order. For example, an order message with an order that is filled is weighted as "−1" and an order message with an order within the inside market is weighted as "−0.5."

In some examples, when order messages are sent that adversely affect trading markets, the message ratio is debited. In some examples, order messages are weighted such that order messages with orders that are farther outside of the inside market count as more messages. For example, an order message with an order that is one ticks away from the inside market increases the weighted message total by "1" and an order message with an order that is two ticks away from the inside market increases the weighted message total by "1.5."

Example messaging monitoring and control systems disclosed herein are implemented by different participants of trading systems. In some examples, an example messaging monitoring and control system is implemented by an exchange to track order messages by trading firm. In some examples, an example messaging monitoring and control system is implemented by a trading firm to track order messages by trader.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. BRIEF DESCRIPTION OF CERTAIN EMBODIMENTS

Example methods, systems, and tangible computer readable storage media disclosed herein provide for tracking of order messages. An example method includes tracking, using a computing device, an order message, the order message including an order for a tradeable object in a trading market. The trading market includes an inside market. The example method includes determining, using the computing device, whether the order is directed to the inside market of the trading market. If the order is determined to be directed to the inside market, the example method includes adjusting a weighting factor to decrease a message ratio. The message ratio compares a weighted order message total to a fill total. If the order is determined to be directed away from the inside market, the example method includes adjusting a weighting factor to increase the message ratio. The example method includes determining, using the computing device, if the message ratio satisfies a message ratio threshold. The example method includes implementing, using the computing device, message ratio handling if the message ratio satisfies the message ratio threshold.

An example system includes a message identifying module to track an order message, the order message including an order for a tradeable object in a trading market. The trading market includes an inside market. The example system includes a ratio calculator module to determine whether the order is directed to the inside market of the trading market. If the order is determined to be directed to the inside market, the example ratio calculator module is to adjust a weighting factor to decrease a message ratio. The message ratio compares a weighted order message total to a fill total. If the order is determined to be directed away from the inside market, the example ratio calculator module is to adjust a weighting factor to increase the message ratio. The example system includes a threshold comparator module to determine if the message ratio satisfies a message ratio threshold. The example system includes a warning module to implement message ratio handling if the message ratio satisfies the message ratio threshold.

An example tangible computer readable storage medium comprises instructions that, when executed, cause a computing device to track an order message, the order message including an order for a tradeable object in a trading market. The trading market includes an inside market. The example instructions cause the computing device to determine whether the order is directed to the inside market of the trading market. If the order is determined to be directed to the inside market, the example instructions cause the computing device to adjust a weighting factor to decrease a message ratio. The message ratio compares a weighted order message total to a fill total. If the order is determined to be directed away from the inside market, the example instructions cause the computing device to adjust a weighting factor to increase the message ratio. The example instructions cause the computing device to determine if the message ratio satisfies a message ratio threshold. The example instructions cause the computing device to implement message ratio handling if the message ratio satisfies the message ratio threshold.

II. EXAMPLE ELECTRONIC TRADING SYSTEM

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive trading market data from the exchange 130 through the gateway 120. A user may utilize the trading device 110 to monitor this trading market data and/or base a decision to send an order message to buy or sell one or more tradeable objects to the exchange 130.

Trading market data may include data about a trading market for a tradeable object. For example, trading market data may include the inside market, market depth, last traded price ("LTP"), a last traded quantity ("LTQ"), or a combination thereof. The inside market is the lowest available ask price (best offer) and the highest available bid price (best bid) in the trading market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL™, AUTOSPREADER®, and/or AUTOTRADER®, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display trading market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more trading markets. For example, a trading tool may allow a user to obtain and view trading market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or un-requested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform trading market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces trading market data from the exchange 130 and provides it to the trading device 110. In yet another example, the gateway 120 may include a trading application that provides risk processing, calculates implieds, handles order processing, handles trading market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide trading market data. Trading market data may be provided in one or more messages or data packets or through a shared memory system. For example, the exchange 130 may publish a data feed to subscribing devices, such as the trading device 110 or gateway 120. The data feed may include trading market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. EXPANDED EXAMPLE ELECTRONIC TRADING SYSTEM

Figure 2:
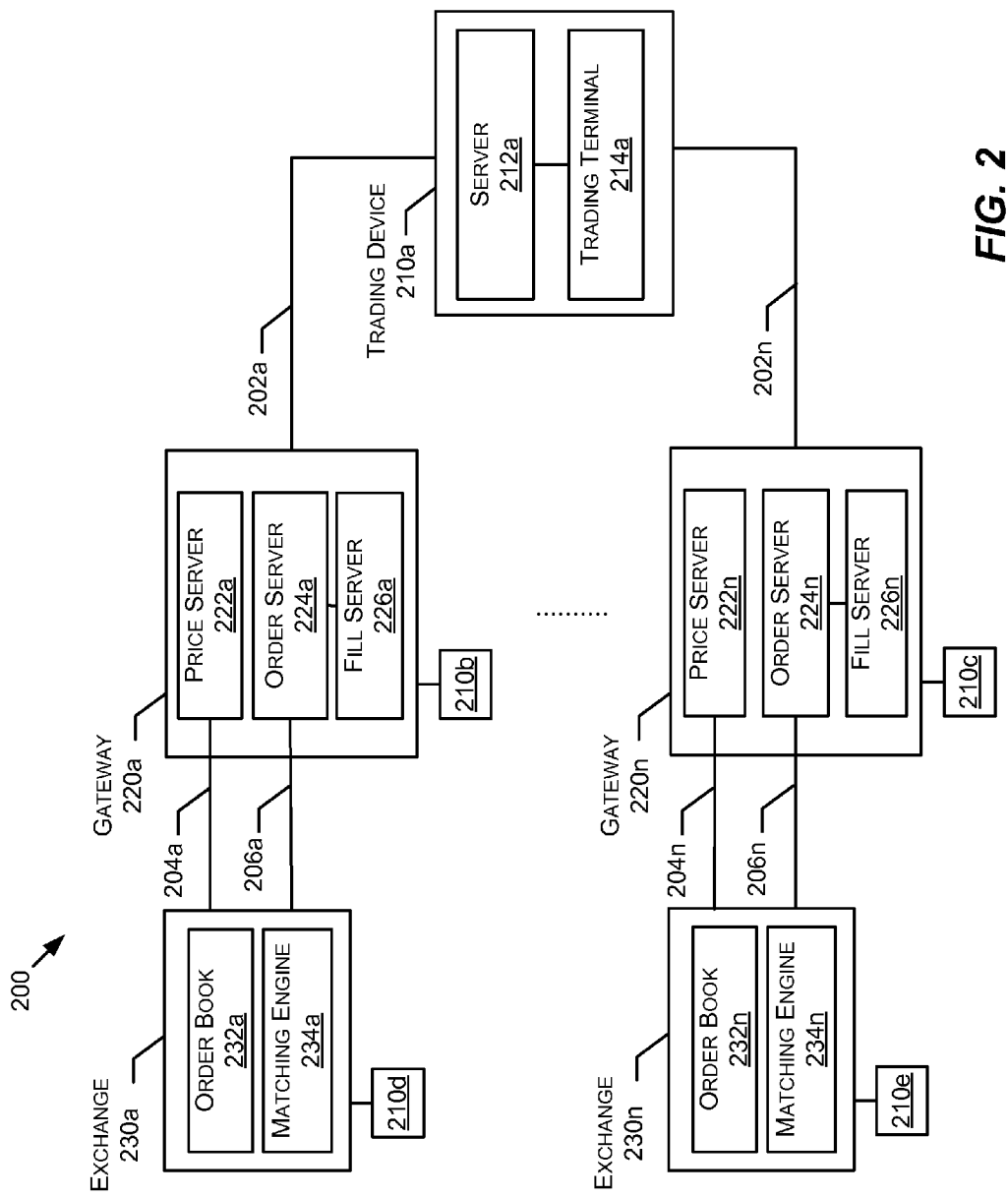
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on trading market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a trading market for one or more tradeable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks. For example, as shown in FIG. 2, there may be two communication networks connecting the gateway 220a and the exchange 230a. The network 204a may be used to communicate trading market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a trading market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. EXAMPLE COMPUTING DEVICE

Figure 3:
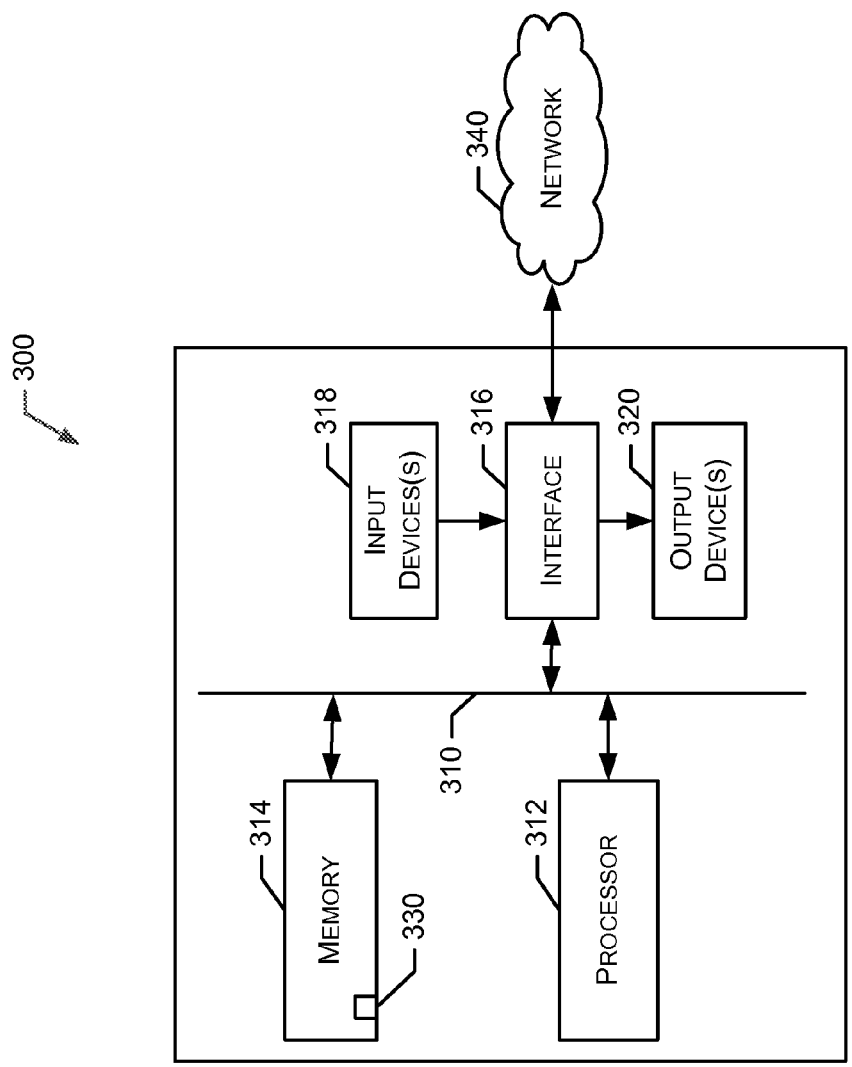
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or microcode, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. STRATEGY TRADING

In addition to buying and/or selling a single tradeable object, a user may trade more than one tradeable object according to a trading strategy. One common trading strategy is a spread and trading according to a trading strategy may also be referred to as spread trading. Spread trading may attempt to capitalize on changes or movements in the relationships between the tradeable object in the trading strategy, for example.

An automated trading tool may be utilized to trade according to a trading strategy, for example. For example, the automated trading tool may AUTOSPREADER®, provided by Trading Technologies.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

In addition, the spread ratio for each leg may be collectively referred to as the spread ratio or strategy ratio for the trading strategy. For example, if leg A has a spread ratio of "2" and leg B has a spread ratio of "−3", the spread ratio (or strategy ratio) for the trading strategy may be expressed as "2:−3" or as "2:3" if the sign for leg B is implicit or specified elsewhere in a trading strategy definition.

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 4:
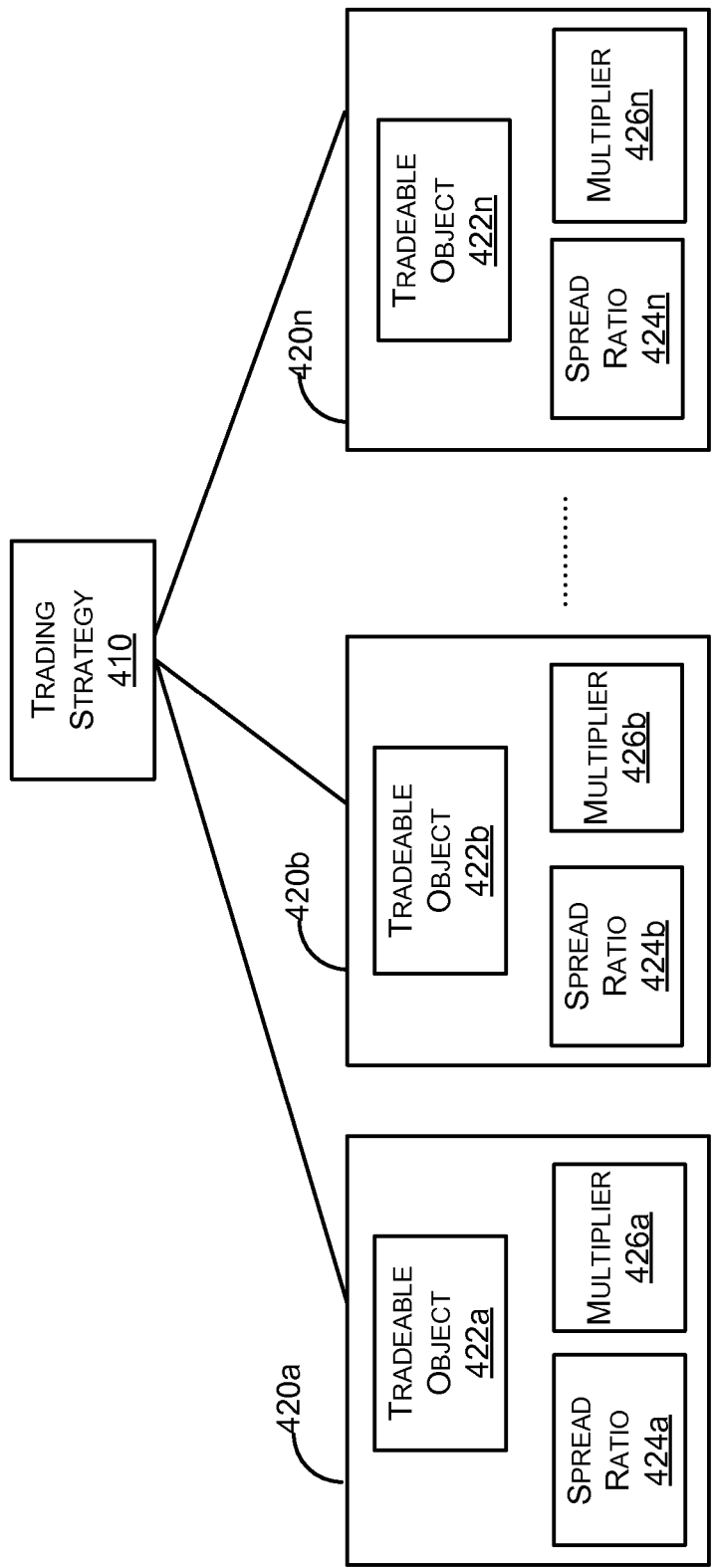
FIG. 4 illustrates a block diagram of a trading strategy which may be employed with certain disclosed embodiments.

FIG. 4 illustrates a block diagram of a trading strategy 410 which may be employed with certain disclosed embodiments. The trading strategy 410 includes "n" legs 420 (individually identified as leg 420a to leg 420n). The trading strategy 410 defines the relationship between tradeable objects 422 (individually identified as tradeable object 422a to tradeable object 422n) of each of the legs 420a to 420n using the corresponding spread ratios 424a to 424n and multipliers 426a to 426n.

Once defined, the tradeable objects 422 in the trading strategy 410 may then be traded together according to the defined relationship. For example, assume that the trading strategy 410 is a spread with two legs, leg 420a and leg 420b. Leg 420a is for tradeable object 422a and leg 420b is for tradeable object 422b. In addition, assume that the spread ratio 424a and multiplier 426a associated with leg 420a are "1" and that the spread ratio 424b and multiplier 426b associated with leg 420b are "−1". That is, the spread is defined such that when the spread is bought, 1 unit of tradeable object 422a is bought (positive spread ratio, same direction as the spread) and 1 unit of tradeable object 422b is sold (negative spread ratio, opposite direction of the spread). As mentioned above, typically in spread trading the opposite of the definition applies. That is, when the definition for the spread is such that when the spread is sold, 1 unit of tradeable object 422a is sold (positive spread ratio, same direction as the spread) and 1 unit of tradeable object 422b is bought (negative spread ratio, opposite direction of the spread).

The price for the trading strategy 410 is determined based on the definition. In particular, the price for the trading strategy 410 is typically the sum of price the legs 420 comprising the tradeable objects 422 multiplied by corresponding multipliers 426. The price for a trading strategy may be affected by price tick rounding and/or pay-up ticks. However, both of these implementation details are beyond the scope of this discussion and are well-known in the art.

Recall that, as discussed above, a real spread may be listed at an exchange, such as exchange 130 and/or 230, as a tradeable product. In contrast, a synthetic spread may not be listed as a product at an exchange, but rather the various legs of the spread are tradeable at one or more exchanges. For the purposes of the following example, the trading strategy 410 described is a synthetic trading strategy. However, similar techniques to those described below may also be applied by an exchange when a real trading strategy is traded.

Continuing the example from above, if it is expected or believed that tradeable object 422a typically has a price 10 greater than tradeable object 422b, then it may be advantageous to buy the spread whenever the difference in price between tradeable objects 422a and 422b is less than 10 and sell the spread whenever the difference is greater than 10. As an example, assume that tradeable object 422a is at a price of 45 and tradeable object 422b is at a price of 40. The current spread price may then be determined to be (1)(45)+(−1)(40) =5, which is less than the typical spread of 10. Thus, a user may buy 1 unit of the spread, which results in buying 1 unit of tradeable object 422a at a price of 45 and selling 1 unit of tradeable object 422b at 40. At some later time, the typical price difference may be restored and the price of tradeable object 422a is 42 and the price of tradeable object 422b is 32. At this point, the price of the spread is now 10. If the user sells 1 unit of the spread to close out the user's position (that is, sells 1 unit of tradeable object 422a and buys 1 unit of tradeable object 422b), the user has made a profit on the total transaction. In particular, while the user bought tradeable object 422a at a price of 45 and sold at 42, losing 3, the user sold tradeable object 422b at a price of 40 and bought at 32, for a profit of 8. Thus, the user made 5 on the buying and selling of the spread.

The above example assumes that there is sufficient liquidity and stability that the tradeable objects can be bought and sold at the market price at approximately the desired times. This allows the desired price for the spread to be achieved. However, more generally, a desired price at which to buy or sell a particular trading strategy is determined. Then, an automated trading tool, for example, attempts to achieve that desired price by buying and selling the legs at appropriate prices. For example, when a user instructs the trading tool to buy or sell the trading strategy 410 at a desired price, the automated trading tool may automatically place an order (also referred to as quoting an order) for one of the tradeable objects 422 of the trading strategy 410 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned on price, lean price, or lean level. Typically, if there is sufficient quantity available, the target price may be the best bid price when selling and the best ask price when buying. The target price may be different than the best price available if there is not enough quantity available at that price or because it is an implied price, for example. As the leaned on price changes, the price for the order in the quoting leg may also change to maintain the desired strategy price.

The leaned on price may also be determined based on a lean multiplier and/or a lean base. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. The lean multiplier and lean base may also be used in combination. For example, the lean base and lean multiplier may be utilized such that larger of the two is used or they may be used additively to determine the amount of quantity to be available.

When the quoting leg is filled, the automated trading tool may then submit an order in the hedge leg to complete the strategy. This order may be referred to as an offsetting or hedging order. The offsetting order may be placed at the leaned on price or based on the fill price for the quoting order, for example. If the offsetting order is not filled (or filled sufficiently to achieve the desired strategy price), then the strategy order is said to be "legged up" or "legged" because the desired strategy relationship has not been achieved according to the trading strategy definition.

In addition to having a single quoting leg, as discussed above, a trading strategy may be quoted in multiple (or even all) legs. In such situations, each quoted leg still leans on the other legs. When one of the quoted legs is filled, typically the orders in the other quoted legs are cancelled and then appropriate hedge orders are placed based on the lean prices that the now-filled quoting leg utilized.

VI. MESSAGING MONITORING AND CONTROL

Trading devices communicate order messages to exchanges to buy or sell tradeable objects. It is desirable for an order message attempting to place an order to buy a particular tradable object to be filled at the exchange. If an order associated with order message is not filled, it is desirable for the position of the order message to be within the inside market, or close to the inside market. It is undesirable for orders associated with order messages to be outside of the inside market because such orders are unlikely to be filled. It is undesirable for an excessive amount of order messages to be sent to exchanges. It may be undesirable for order messages to be sent to the exchange and subsequently altered and/or deleted (e.g., orders that are sent and then immediately deleted). Such undesirable order messages may adversely affect electronic trading systems (e.g., including exchanges, trading devices, etc.) as such order messages may harm trading market liquidity, and impact trading system bandwidth, etc.

Example messaging monitoring and control systems disclosed herein enable tracking of order messages in trading systems and provide mechanism by which messaging traffic may be managed to encourage the sending of order messages that improve trading markets and discourage the sending of order messages that adversely affect trading markets. Example messaging monitoring and control systems disclosed herein implement a mechanism utilizing message ratios and message ratio thresholds to establish a reward system that, in turn, encourages efficient messaging and resource allocation at an exchange. Example message ratios compare weighted order message totals (e.g., the total number of messages communicated to an exchange multiplied by a weighting factor) to a total number of filled totals. Order messages are weighted so that order messages that improve trading markets decrease the weighted order message total and order messages that do not improve trading markets increase the weighted order message total. In other words, the example mechanism has the effect of encouraging (e.g., rewarding) the communication of desirable messages (e.g., message that improve the market) to the exchange and discouraging the communication of less desirable messages (e.g., messages away from the inside market or messages that remain in the market for only a brief period of time.)

In an example messaging monitoring and control system, a message ratio threshold defines a limit on weighted order message totals based on fill totals. For example, the message ratio threshold hold could be defined such that for every two hundred (200) messages communicated to the exchange, there must be at least one (1) fill. In other words, the message ratio threshold could be set to a ratio of 200:1. In this example, the 200:1 ratio could be determined by summing the adjusted weight of each of the sent messages. The adjusted weight, in turn, can be calculated by either a positive or negative weighting factor based on the effect each message has on the market. Thus, as a user trades in a trading market, an example messaging monitoring and control system tracks the order messages being sent by the user and updates a message ratio for the user. For example, if the user sends many order messages with orders outside of the inside market (e.g., five ticks off the inside market) and fills few orders in comparison, the user is likely to satisfy (e.g., exceed) the message ratio threshold. If the user's message ratio exceeds the message ratio threshold (e.g., the user receives fewer than one fill for every two hundred weighted messages sent to the exchange), the user's message traffic is considered to be adverse message traffic and is impermissible and even discouraged. Example penalties for adverse message traffic could include one-time fines, suspension of trading privileges for a period of time, an increase in trading fees and/or a reduction in the user's trading priority. The example messaging monitoring and control system may alternatively reward or otherwise encourage messaging traffic determined to be positive message traffic. Example encouragement for disciplined message traffic may include reduced trading fees, an increase in trading priority, a refund of trading fees and/or other direct monetary reimbursement.

In another example messaging monitoring and control system, a message ratio threshold defines a limit on weighted order message totals based on weighted fill totals. In this example, order messages are weighted so that order messages that improve trading markets increase the weighted fill total and do not increase the weighted order message totals and order messages that do not improve trading markets increase the weighted order message total and do not increase the weighted fill total. For example, a fill may increase the weighted fill total by one (1) and an order message with an order that improves the trading market may increase the weighted fill total by a fraction of one (e.g., 0.5). Order messages outside of the inside market may increase the weighted order message total. For example, an order one tick off the inside market increases the weighted order message total by one (1) and an order two ticks off the inside market increases the weighted order message total by one and one half (1.5).

Figure 5:
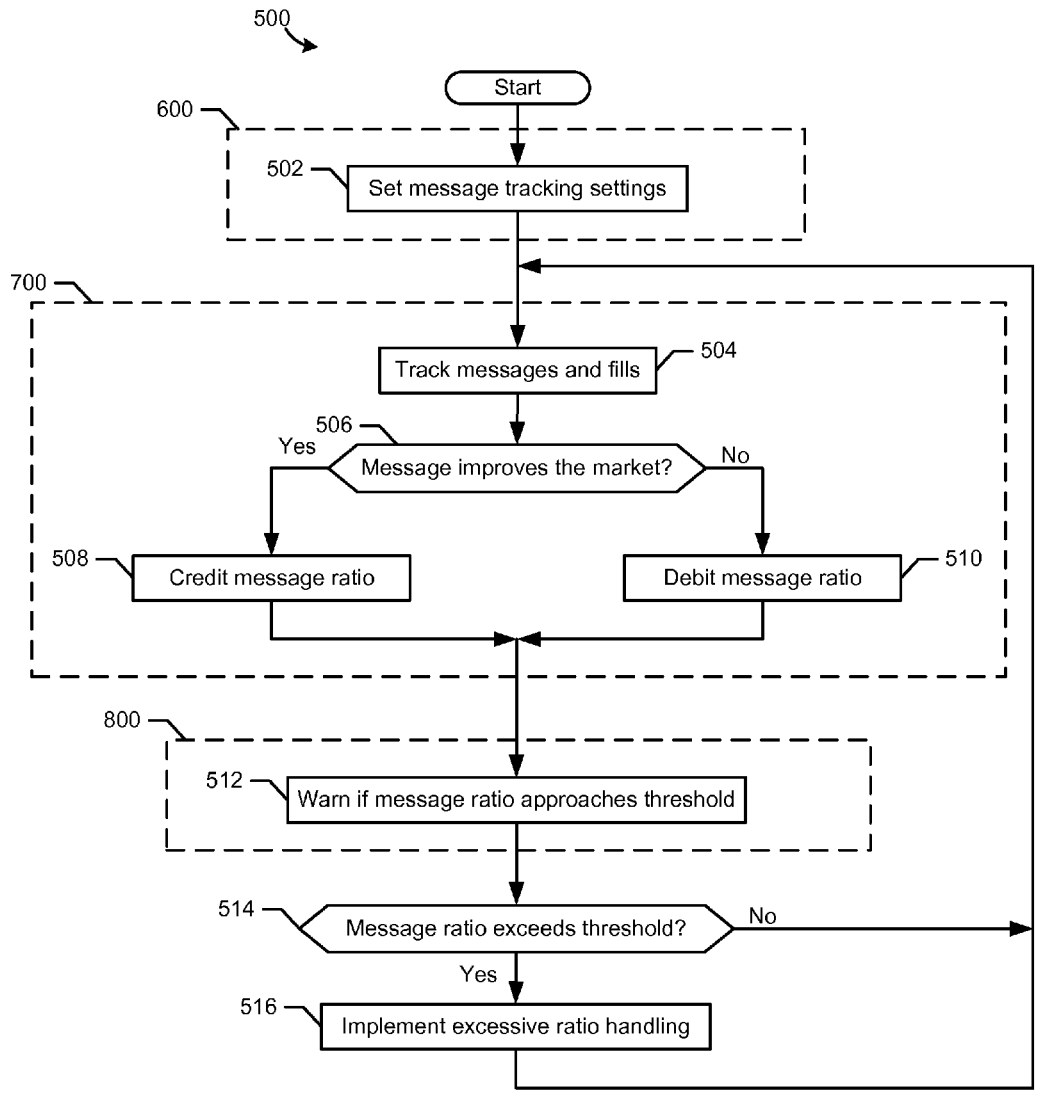
FIG. 5 illustrates a flow diagram of an example method for tracking order messages using message ratios.

FIG. 5 illustrates a flow diagram of an example method 500 to track order messages using weighted message ratios. Tracking order messages enables an example messaging monitoring and control system to encourage order messages to be sent to exchanges that improve trading markets (e.g., order messages with orders within the inside market that increase trading market liquidity) and to discourage order messages from being sent to exchanges that adversely affect trading markets and/or trading systems (e.g., order messages with orders that are outside of the inside market that decrease trading market liquidity). In the illustrated example, order messages are tracked as they are sent and/or received, and a message ratio is updated. A message ratio compares a weighted order message total to a fill total. If an order message improves the trading market, the message ratio is credited. If an order message does not improve the trading market, the message ratio is debited. The message ratio is compared to a message ratio threshold.

The message ratio threshold may be set to penalize users reaching a particular amount of order messages per fills and/or set to reward users reaching a particular amount of fills per order messages. One or more message ratio thresholds may be implemented by the example messaging monitoring and control system to facilitate management of messaging traffic to the exchange. In an example system, if the message ratio satisfies (e.g., exceeds) the message ratio threshold (e.g., the message ratio is excessive), a user is notified of the excessive message ratio, and/or a fine and/or a penalty may be assessed. To implement the example system, the message ratio threshold is used to define limits on excessive order message totals. In an example reward system, if the message ratio satisfies (e.g., exceeds) the message ratio threshold, a user is rewarded. To implement the example system, the message ratio threshold is used to define a minimum amount of fills which, if exceeded, results in a reward for the user. The example system provides dynamic mechanism by which the behavior of automated trading algorithms may be influenced to insure the overall efficiency of the market.

Initially, in the illustrated example, message tracking settings are set (block 502). Message tracking settings describe how the example messaging monitoring and control system is to be implemented. The message tracking settings describe how a message ratio is to be calculated. The message tracking settings describe message counts, message weights, message ratio thresholds, time periods for message tracking, users to be tracked, etc. In some examples, the message tracking settings are set by users (e.g., traders), administrators, exchanges, trading firms, etc. Alternatively, the message tracking settings are set automatically (e.g., default values are used to implement the messaging monitoring and control system). A method 600 for setting message tracking settings corresponding to block 502 of FIG. 5 is described in greater detail below with reference to FIG. 6.

Once message tracking settings are set (block 502), the example messaging monitoring and control system tracks order messages and fills (block 504). The example messaging monitoring and control system monitors order messages and/or fill confirmations that are sent and/or received between, for example, a trading device and an exchange. When an order message and/or fill confirmation is sent and/or received, the example messaging monitoring and control system determines if the order message and/or fill confirmation improves the trading market (block 506). Fill confirmations confirm that an order associated with an order message was filled. If a fill confirmation is sent and/or received, the example messaging monitoring and control system determines that the corresponding order message (e.g., the order message including the order that was filled) improves the trading market. If an order message is sent and/or received with an order that is within the inside market, the example messaging monitoring and control system determines that the order message improves the trading market. If an order associated with an order message is outside or away from the inside market, the example messaging monitoring and control system determines that the order message does not improve the trading market. If an order message with an order is sent and then the order is deleted in a subsequent order message (e.g., the order is deleted within a threshold period of time), the example messaging monitoring and control system determines that the order message does not improve the trading market.

If an order message improves the trading market, the message ratio is credited (block 508). The message ratio is credited based on the type of order message (e.g., an order within the inside market or a fill) using message weights defined by the message tracking settings. In one example, the message weight could be a negative factor that when applied against the order message that improves the trading market decreases the weighted order message total by of by half (e.g., a weighting multiplier of −0.5 reduces the value of the favorable order message by −0.5). Table 1 depicts an example messaging monitoring and control weighting scheme. Alternate weighting schemes and multipliers may be utilized to encourage and control trade messaging behavior. Similarly, if an order message does not improve the trading market, the message ratio is debited (block 510). The message ratio is debited based on the type of order message (e.g., how far the order is from the inside market) using message weights defined by the message tracking settings. A method 700 for monitoring order messages and determining message ratios corresponding to blocks 504, 506, 508, and 510 of FIG. 5 is described in greater detail below with reference to FIG. 7.

TABLE 1

Messaging Monitoring and Control Weighting Scheme

| Price Difference From The Inside Market | Weighting Multiplier | Description |
| --- | --- | --- |
| Best bid or best offer | −1.0 | If the order price is at the best bid or offer, the order message decreases the weighted order message total by one full order. |
| None - At the Inside Market | −0.5 | If the order price is at the best bid or offer, the order message decreases the weighted order message total by one half of an order. |
| 1 Tick off the Inside Market | 1.0 | If the order price is one tick away from the Inside Market, the order message counts as a full order when calculating the weighted order message total. |
| 2 Ticks off the Inside Market | 1.5 | If the order price is two ticks away from the Inside Market, the order message increases the weighted order message total by one and a half orders. |

If the message ratio approaches the message ratio threshold (e.g., a limit on order messages that fail to improve and/or harm the trading market, a minimum number of fills to receive a reward, etc.), the example messaging monitoring and control system optionally issues a warning or alert associated with the message ratio threshold (block 512). The warning or alert is issued to inform a user that the message ratio is approaching the message ratio threshold to aid the user in determining message orders to be sent in the future (e.g., to encourage the user to send order messages that improve the trading market and to discourage the user from sending order messages that harm the trading market). A method 800 for presenting a warning or alert when a message ratio is approaching a message ratio threshold corresponding to block 512 of FIG. 5 is described in greater detail below with reference to FIG. 8. In some examples, the process 500 does not include block 512 and a warning associated with the message ratio approaching the message ratio threshold is not issued.

The example messaging monitoring and control system determines if the message ratio satisfies and/or exceeds the message ratio threshold (block 514). If the message ratio does not exceed the message ratio threshold, control returns to block 504 and the example messaging monitoring and control system continues to track order messages and/or fills. If the message ratio exceeds the message ratio threshold (e.g., too many order messages have been sent that fail to improve and/or harm the trading market, enough fills have been achieved to receive a reward, etc.), the example messaging monitoring and control system implements excessive message ratio handling (block 516). The example messaging monitoring and control system issues a notification to a user informing the user that the message ratio associated with order messages being sent by the user has exceeded the message ratio threshold. In some examples, the notification is issued on a display of a trading device associated with the user. Additionally or alternatively, the example messaging monitoring and control system issues a notification to a trading firm informing the trading firm that the message ratio associated with order messages being sent by the trading firm (e.g., by multiple traders of a single trading firm) has exceeded the message ratio threshold. The example messaging monitoring and control system may issue a fine associated with the excessive message ratio to a user and/or trading firm. The example messaging monitoring and control system may issue a reward associated with the excessive message ratio to a user and/or trading firm. Once the example trading system has implemented the excessive message ratio handling, control returns to block 504 and the example trading system continues to track order messages and/or fills.

Figure 6:
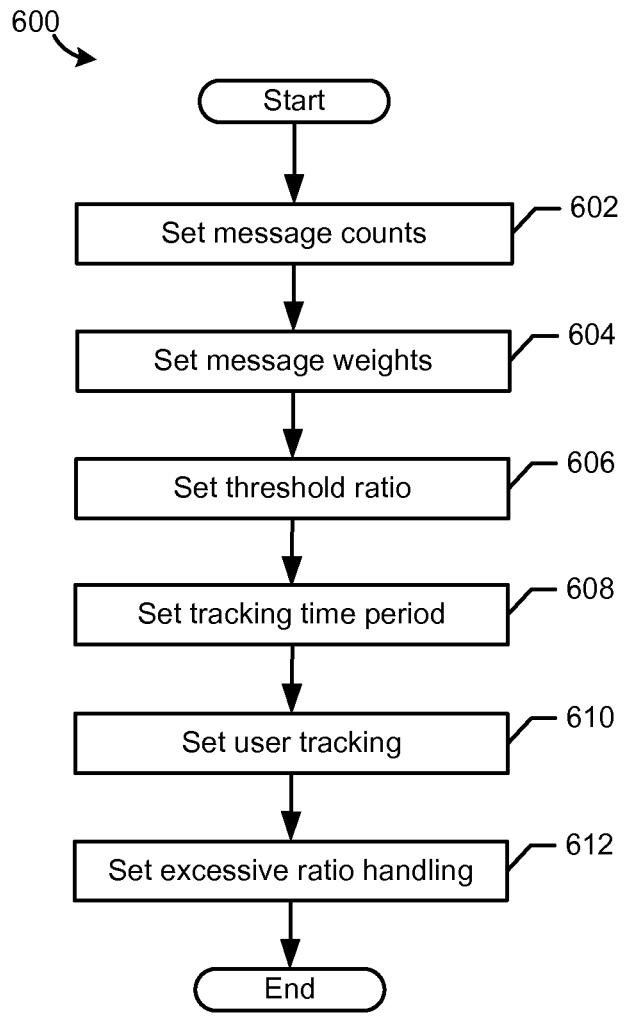
FIG. 6 illustrates a flow diagram of an example method for setting message tracking settings.

FIG. 6 illustrates a flow diagram of an example method 600 to set message tracking settings. The example method 600 corresponds to block 502 of FIG. 5. In some examples, the message tracking settings are set by users (e.g., traders), administrators, exchanges, trading firms, etc. Alternatively, the message tracking settings are set automatically (e.g., default values are used to implement the messaging monitoring and control system). Initially, in the illustrated example, message counts are set (block 602). Message counts describe how order messages are to be counted. In some examples, each order message, including related order messages, counts as one message. For example, where a first order message is sent and a second order message is sent deleting the order of the first order message, the first order message and the second order message each count as one message. Where order messages each count as one message, each order message associated with a spread trading strategy counts as one message.

In the illustrated example, message weights are set (block 604). Message weights describe how order messages are to be weighted when calculating message ratios. An order message that improves a trading market is weighted such that the message ratio improves when the order message is factored into the message ratio. To improve the message ratio (e.g., to credit the message ratio), the order message is weighted so that the weighted order message total of the message ratio decreases. In some examples, order messages are weighted such that order messages with orders that are filled decrease the weighted order message total by one (e.g., −1.0) and order messages with orders that are within the inside market decrease the weighted order message total by a fraction of one. For example, an order message with an order that is filled decreases the weighted order message total of the message ratio by "1" and an order message with an order within the inside market decreases the weighted fill total of the message ratio by "0.5."

An order message that does not improve and/or harms a trading market is weighted such that the message ratio worsens when the order message is factored into the message ratio. To worsen the message ratio (e.g., to debit the message ratio), the order message is weighted so that the weighted message total of the message ratio increases and the weighted fill total of the message ratio remains constant. In some examples, order messages are weighted such that order messages with orders that are farther outside of the inside market count as multiple messages in the weighted message total of the message ratio. For example, an order message with an order that is one tick away from the inside market increases the weighted message total by "1." An order message with an order that is two ticks away from the inside market increases the weighted message total by "1.5."

In some examples, message weights are fixed values. Alternatively, message weights may vary based on the user (e.g., more experienced traders may be tracked with different message weights than less experienced traders). Message weights may vary based on the time of day (e.g., message weights may be different one hour before trading markets close than when trading markets open).

In the illustrated example, a message ratio threshold is set (block 606). In some examples, to implement a discipline system, the message ratio threshold compares a maximum weighted order message total to a fill total. The message ratio threshold may describe a limit of weighted messages that may be sent when compared to a number of fills. For example, the message ratio threshold is set such that when the threshold is satisfied (e.g., exceeded), excessive ratio handling is implemented to discipline (e.g., punish) users that exceeded the message ratio threshold. Users are disciplined that have sent too many order messages that harm the trading market when compared to the number of fills that the users have achieved.

In some examples, to implement a reward system, the message ratio threshold compares a minimum fill total to a weighted order message total. The message ratio threshold may describe a minimum number of fills that may be achieved when compared to a weighted message total. For example, the message ratio threshold is set such that when the threshold is satisfied (e.g., exceeded), excessive ratio handling is implemented to reward users that exceeded the message ratio threshold. Users are rewarded that have achieved a sufficient number of fills that improve the trading market when compared to the number of order messages that have been sent.

In the illustrated example, a tracking time period is set (block 608). The tracking time period describes a time period over which the messaging monitoring and control system will monitor order messages. In some examples, the tracking time period is one day. Alternatively, the tracking time period may be one week, one month, etc.

In the illustrated example, user tracking is set (block 610). User tracking settings describe users that are to be tracked by the example messaging monitoring and control system. In some examples, particular users (e.g., traders) are tracked. For example, less experienced users are tracked. Additionally or alternatively, trading firms are collectively tracked. For example, traders associated with a trading firm are tracked and a message ratio for the trading firm is updated based on order messages sent by each of the associated traders.

In the illustrated example, excessive ratio handling is set (block 612). Excessive ratio handling settings describe actions that are to be taken when message ratio thresholds are exceeded. A user and/or trading firm is notified when a message ratio threshold is exceeded. In some examples, where a discipline system is implemented, a user and/or trading firm is fined (e.g., with a monetary amount) when a message ratio threshold is exceeded. Additionally or alternatively, a user and/or trading firm is suspended from trading when a message ratio threshold is exceeded. The user and/or trading firm is penalized because a larger amount of order messages have been sent when compared with a total number of fills that have been achieved.

In some examples, where a reward system is implemented, a user and/or trading firm is rewarded (e.g., with a monetary amount) when a message ratio threshold is exceeded. The user and/or trading firm is rewarded because a larger amount of order fills have been achieved when compared with a total number of order messages that have been sent. Once the excessive ratio handling is set, the process 600 ends and the example messaging monitoring and control system begins tracking order messages according to the set message tracking settings.

Figure 7:
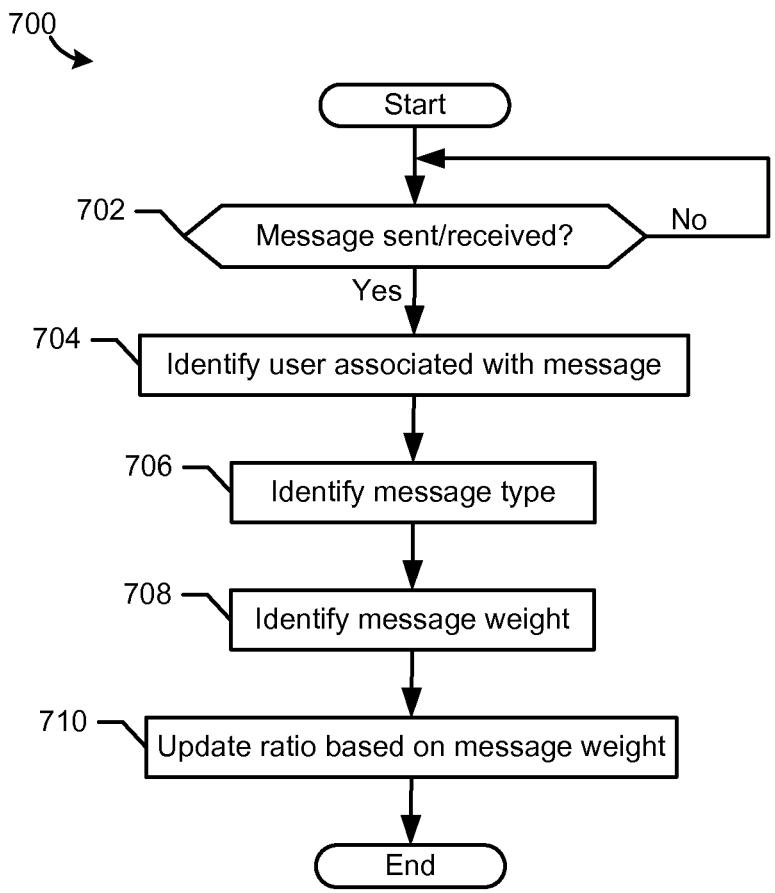
FIG. 7 illustrates another flow diagram of an example method for tracking order messages.

FIG. 7 illustrates a flow diagram of an example method 700 for monitoring order messages and determining message ratios. The example method 700 corresponds to blocks 504, 506, 508, and 510 of FIG. 5. Initially, the example messaging monitoring and control system determines if an order message and/or fill confirmation has been sent and/or received (block 702). In some examples, the example messaging monitoring and control system is implemented at a trading device and tracks when order messages are sent to an exchange and when fill confirmations are received from the exchange. Additionally or alternatively, the example messaging monitoring and control system is implemented at an exchange and tracks when order messages are received from a trading device and when fill confirmations are sent to the trading device. Control remains at block 702 until an order message and/or fill confirmation is sent and/or received.

Once an order message and/or a fill confirmation has been sent and/or received, the example messaging monitoring and control system identifies a user associated with the order message and/or the fill confirmation (block 704). The example messaging monitoring and control system may identify an individual user (e.g., an individual trader), a trading firm, or both an individual user and a trading firm associated with the individual user.

The example messaging monitoring and control system identifies a message type of the order message and/or the fill confirmation (block 706). For example, the example messaging monitoring and control system may determine that an order message is within the inside market. The example messaging monitoring and control system may determine that an order message resulted in a fill based on the fill confirmation. The example messaging monitoring and control system may determine that an order associated with an order message is outside of the inside market. The example messaging monitoring and control system may determine how far the order of the order message is from the inside market (e.g., 5 ticks away). The example messaging monitoring and control system may determine that an order message deletes an order within a threshold period of time from when the order was placed (e.g., the order was placed and immediately deleted).

The example messaging monitoring and control system identifies a message weight of the order message and/or the fill confirmation (block 708). The message weight is based on the message type determined at block 706. In some examples, a fill and an order message with an order in the inside market decreases the weighted order message total. An order message with an order outside of the inside market is weighted as a multiple of one order message in the weighted order message total. An order message may be weighted more heavily the farther the order of the order message is from the inside market (e.g., an order message with an order one tick from the inside market counts as one order message and an order message with an order two ticks from the inside market counts as one and one half order messages).

The example messaging monitoring and control system updates a message ratio based on the message weight (block 710). In some examples, the weighted order message total decreases when a fill is achieved (e.g., decreases by one) or when an order associated with an order message is within the inside market (e.g., decreases by one half). The weighted message total may be increased by a multiple of one when an order associated with an order message is outside of the inside market (e.g., increases by one, one and one half, etc.). Once the message ratio is updated, the process 700 ends and the message ratio is analyzed as described in connection with FIG. 5.

Figure 8:
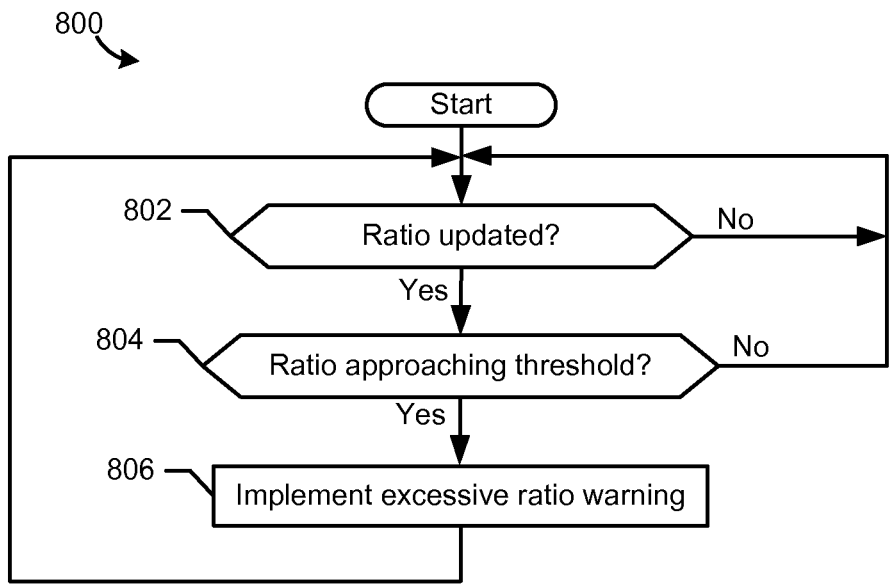
FIG. 8 illustrates a flow diagram of an example method for presenting warnings associated with tracking order messages.

FIG. 8 illustrates a flow diagram of an example method 800 for presenting a warning when a message ratio is approaching a message ratio threshold. The example method 800 corresponds to optional block 512 of FIG. 5 (e.g., the example method 800 may or may not be used in the example method 500 of FIG. 5 to track messages). Initially, the example messaging monitoring and control system determines if a message ratio has been updated (block 802). Message ratios are updated when order messages are sent and/or received. Control remains at block 802 until a message ratio has been updated. If a message ratio has been updated, the example messaging monitoring and control system determines if the message ratio is approaching a message ratio threshold (block 804). For example, where a discipline system is implemented, the example messaging monitoring and control system determines the message ratio is approaching the message ratio threshold if the message ratio is within a particular number of weighted order messages from the weighted order message total defined in the message ratio threshold. Where a reward system is implemented, the example messaging monitoring and control system determines the message ratio is approaching the message ratio threshold if the message ratio is within a particular number of fills from the fill total defined in the message ratio threshold. If the message ratio is not approaching the message ratio threshold, control returns to block 802. If the message ratio is approaching the message ratio threshold, the example messaging monitoring and control system implements an excessive ratio warning or alert (block 806). The example messaging monitoring and control system notifies a user that the message ratio is approaching the message ratio threshold (e.g., via a display on a trading device). Notifying the user that the message ratio is approaching the message ratio threshold enables the user to alter trading strategies (e.g., including order messages) to avoid exceeding the message ratio threshold and, thus, to avoid penalties associated with exceeding the message ratio threshold. Once the excessive ratio warning has been implemented, control returns to block 802.

Figure 9:
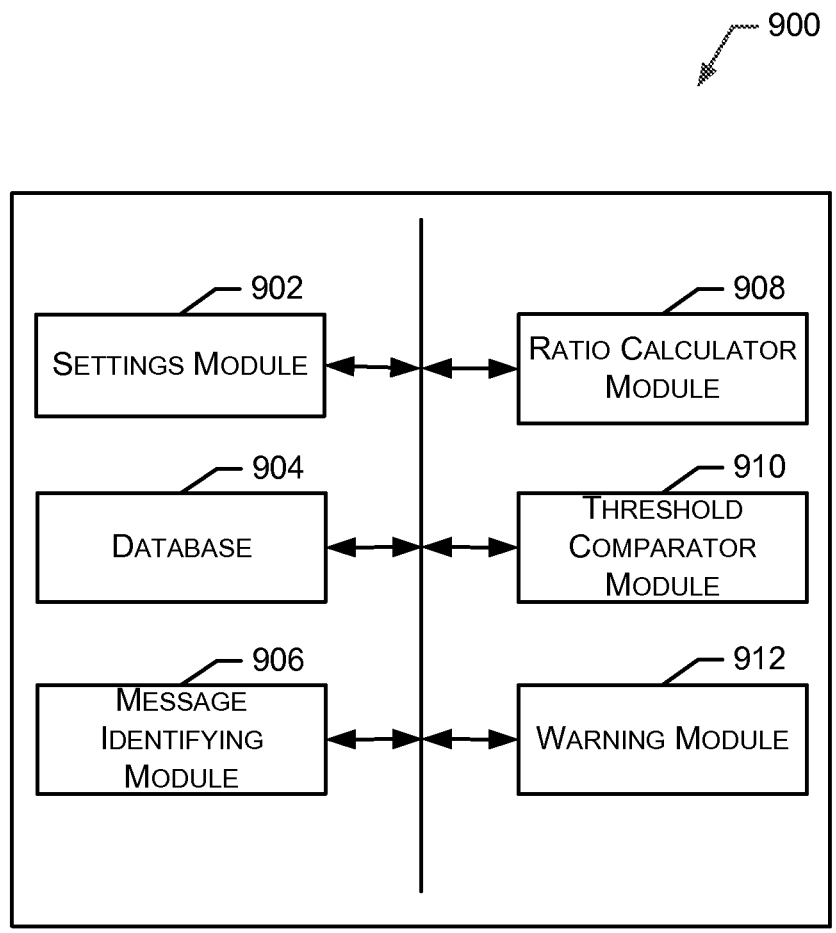
FIG. 9 illustrates a block diagram of an example messaging monitoring and control system to facilitate tracking of order messages.

FIG. 9 illustrates a block diagram of an example messaging monitoring and control system 900 to facilitate tracking of order messages. The example messaging monitoring and control system 900 of the illustrated example implements the example methods 500, 600, 700, and/or 800 of FIGS. 5, 6, 7, and/or 8 to track order messages. In some examples, the messaging monitoring and control system 900 is implemented at a trading device (e.g., the trading device 110 of FIG. 1). In some examples, the messaging monitoring and control system 900 is implemented at an exchange (e.g., the exchange 130 of FIG. 1). In some examples, a trading device implements a messaging monitoring and control system 900 and an exchange implements a messaging monitoring and control system 900 and message tracking is cross-referenced between the trading device and the exchange. For example, if the exchange fines a trading firm using a messaging monitoring and control system 900, a trading firm may use a messaging monitoring and control system 900 at a trading device to determine a particular user (e.g., trader) responsible for the fine.

The example messaging monitoring and control system 900 monitors order messages and/or fill confirmations that are sent and/or received between, for example, a trading device and an exchange, and calculates a message ratio. The message ratio compares weighted message totals with fill totals. When an order message and/or fill confirmation is sent and/or received, the example messaging monitoring and control system 900 determines if the order message and/or fill confirmation improves the trading market. If an order message improves the trading market, the message ratio is credited. If an order message does not improve the trading market, the message ratio is debited. The message ratio is used by the example messaging monitoring and control system 900 to implement warnings, fines, rewards, etc. based on the message ratio. The trading system 900 of the illustrated example includes an example settings module 902, an example database 904, an example message identifying module 906, an example ratio calculator module 908, an example threshold comparator module 910, and an example warning module 912.

The example settings module 902 sets message tracking settings. Message tracking settings describe how the example messaging monitoring and control system 900 is to be implemented. In some examples, the message tracking settings describe how a message ratio is to be calculated. In some examples, the message tracking settings describe message counts, message weights, message ratio thresholds, time periods for message tracking, users to be tracked, etc. In some examples, the message tracking settings are set at the example settings module 902 by users (e.g., traders), administrators, exchanges, trading firms, etc. In some examples, the message tracking settings are set automatically at the example settings module 902 (e.g., default values are used to implement the messaging monitoring and control system 900). The message tracking settings are stored at the database 904.

The example message identifying module 906 tracks and/or identifies order messages and fills. Once an order message and/or a fill confirmation has been sent and/or received, the example message identifying module 906 identifies a user associated with the order message and/or the fill confirmation. The example message identifying module 906 identifies a message type of the order message and/or the fill confirmation. In some examples, the example messaging monitoring and control system 900 determines that an order associated with an order message is within the inside market. In some examples, the example messaging monitoring and control system 900 determines that an order associated with an order message resulted in a fill based on the fill confirmation. In some examples, the example messaging monitoring and control system 900 determines that an order associated with an order message is outside of the inside market. In some such examples, the example messaging monitoring and control system 900 determines how far the order of the order message is from the inside market (e.g., 5 ticks away). In some examples, the example messaging monitoring and control system 900 determines that an order message deletes an order within a threshold period of time from when the order was placed (e.g., the order was placed and immediately deleted).

The example ratio calculator module 908 calculates and/or updates a message ratio based on the message weight. In some examples, a weighted order message total of the message ratio is decreased by one when a fill is achieved and the weighted order message total of the message ratio is decreased by a fraction of one (e.g., one half) when an order associated with an order message is within the inside market. The weighted order message total may be increased by a multiple of one when an order associated with an order message is outside of the inside market.

The example threshold comparator module 910 determines if the message ratio exceeds the message ratio threshold. If the message ratio exceeds the message ratio threshold (e.g., too many order messages have been sent that fail to improve and/or harm the trading market, enough fills have been achieved to receive a reward, etc.), the example warning module 912 implements excessive message ratio handling. In some examples, the example warning module 912 issues a notification to a user informing the user that the message ratio associated with order messages being sent by the user has exceeded the message ratio threshold. In some examples, the notification is issued on a display of a trading device associated with the user. In some examples, the example warning module 912 issues a notification to a trading firm informing the trading firm that the message ratio associated with order messages being sent by the trading firm (e.g., by multiple traders of a single trading firm) has exceeded the message ratio threshold. In some examples, the example warning module 912 issues a fine associated with the excessive message ratio to a user and/or trading firm. In some examples, the example warning module 912 issues a reward associated with the excessive message ratio to a user and/or trading firm.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method comprising:
   tracking, using a computing device, an order message, the order message including an order for a tradeable object in a trading market and wherein the trading market includes an inside market;
   determining, using the computing device, whether the order is directed to the inside market of the trading market;
   adjusting, if the order is determined to be directed to the inside market, a weighting factor to decrease a message ratio corresponding to a predetermined tracking time period, wherein the message ratio compares a weighted order message total to a fill total;
   adjusting, if the order is determined to be directed away from the inside market, a weighting factor to increase the message ratio;
   determining, using the computing device, if the message ratio satisfies a message ratio threshold; and
   implementing, using the computing device, message ratio handling if the message ratio satisfies the message ratio threshold.

2. The method of claim 1, wherein the order is determined to be directed to the inside market if the order is filled.

3. The method of claim 1, wherein the order is determined to be directed away from the inside market if the order is deleted within a threshold period of time from the order being placed.

4. The method of claim 1, wherein the message ratio threshold defines a limit of a weighted order message total per fill total.

5. The method of claim 1, wherein the message ratio is decreased by one when the order is filled.

6. The method of claim 1, wherein the message ratio is decreased by a fraction of one when the order is directed to the inside market.

7. The method of claim 1, wherein the weighting factor increases based on a distance of the order from the inside market.

8. The method of claim 1, wherein implementing message ratio handling includes at least one of implementing a fine, suspending a user associated with the order message, or implementing a reward.

9. The method of claim 1, further comprising providing, using the computing device, a warning to a user associated with the order message if the message ratio approaches the message ratio threshold.

10. A system comprising:
    a message identifying module to track an order message, the order message including an order for a tradeable object in a trading market and wherein the trading market includes an inside market;
    a ratio calculator module to:
       determine whether the order is directed to the inside market of the trading market;
       adjust, if the order is determined to be directed to the inside market, a weighting factor to decrease a message ratio corresponding to a predetermined tracking time period, wherein the message ratio compares a weighted order message total to a fill total; and
       adjust, if the order is determined to be directed away from the inside market, a weighting factor to increase the message ratio;
    a threshold comparator module to determine if the message ratio satisfies a message ratio threshold; and
    a warning module to implement message ratio handling if the message ratio satisfies the message ratio threshold.

11. The system of claim 10, wherein the order is determined to be directed to the inside market if the order is filled.

12. The system of claim 10, wherein the order is determined to be directed away from the inside market if the order is deleted within a threshold period of time from the order being placed.

13. The system of claim 10, wherein the message ratio threshold defines a limit of a weighted order message total per fill total.

14. The system of claim 10, wherein the message ratio is to be decreased by one when the order is filled.

15. The system of claim 10, wherein the message ratio is to be decreased by a fraction of one when the order is directed to the inside market.

16. The system of claim 10, wherein the weighting factor is to be increased based on a distance of the order from the inside market.

17. The system of claim 10, wherein to implement message ratio handling, the warning module is to at least one of implement a fine, suspend a user associated with the order message, or implement a reward.

18. The system of claim 10, wherein the warning module is to provide a warning to a user associated with the order message if the message ratio approaches the message ratio threshold.

19. A tangible computer readable storage medium comprising instructions that, when executed, cause a computing device to at least:
- track an order message, the order message including an order for a tradeable object in a trading market and wherein the trading market includes an inside market;
- determine whether the order is directed to the inside market of the trading market;
- adjust, if the order is determined to be directed to the inside market, a weighting factor to decrease a message ratio corresponding to a predetermined tracking time period, wherein the message ratio compares a weighted order message total to a fill total;
- adjust, if the order is determined to be directed away from the inside market, a weighting factor to increase the message ratio;
- determine if the message ratio satisfies a message ratio threshold; and
- implement message ratio handling if the message ratio satisfies the message ratio threshold.

\* \* \* \* \*